Patented Feb. 4, 1930

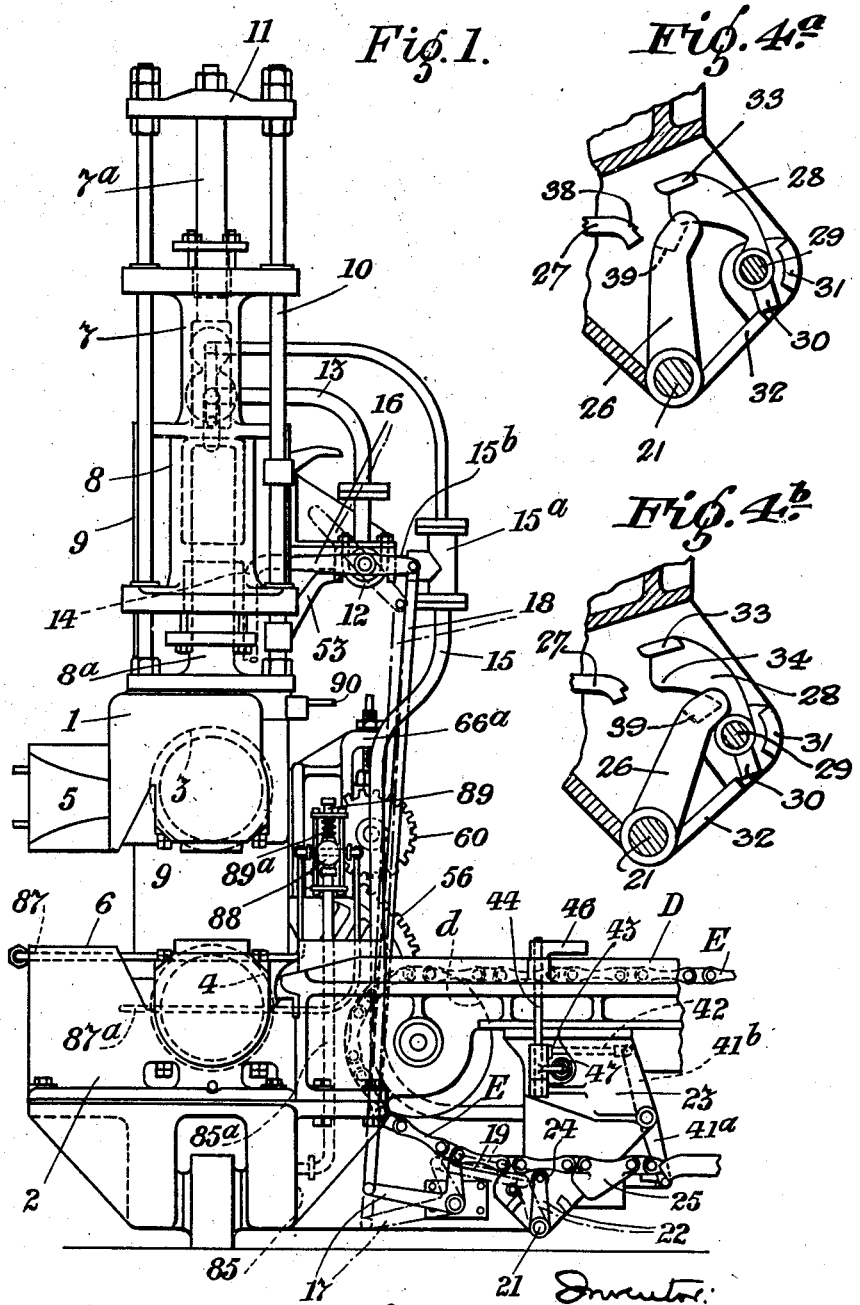

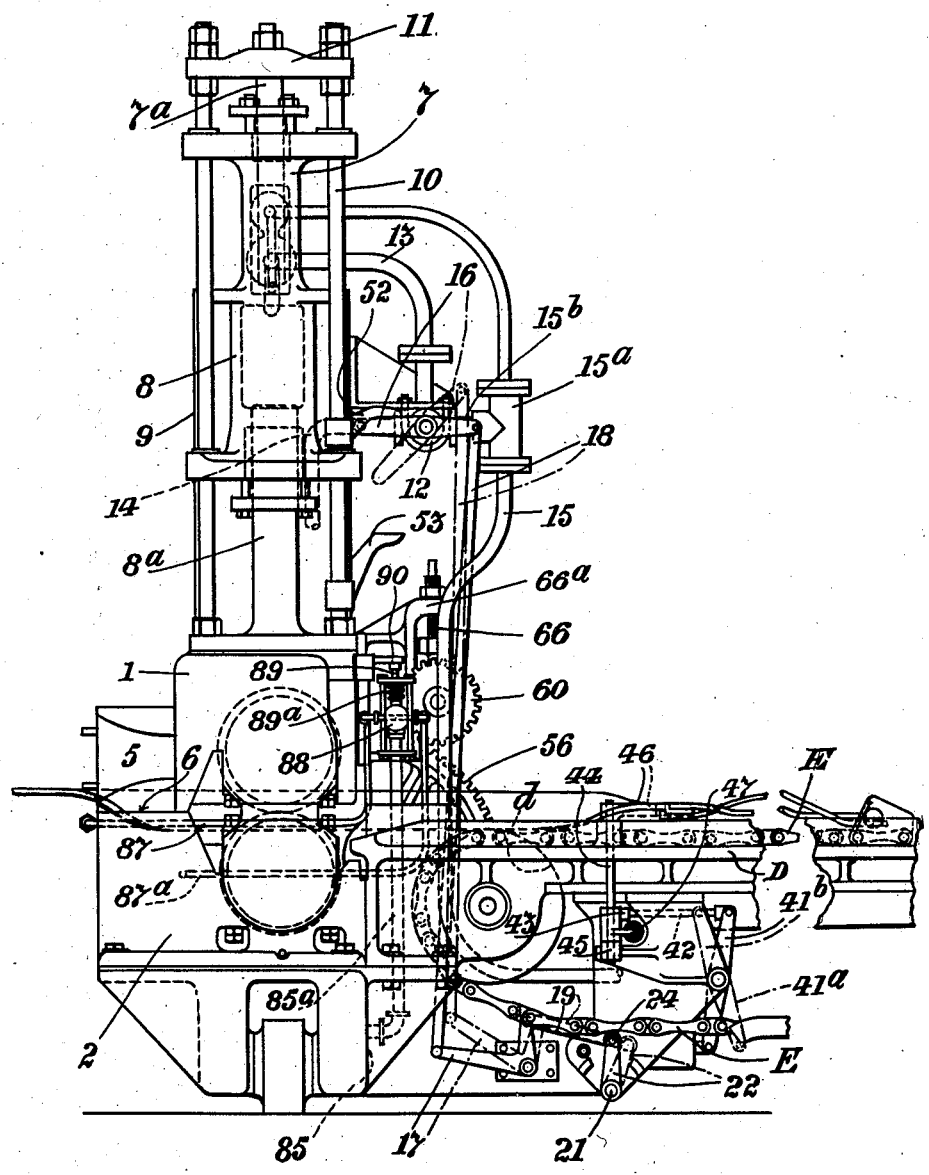

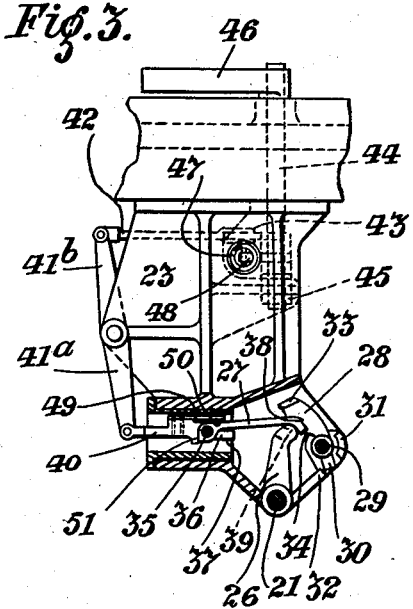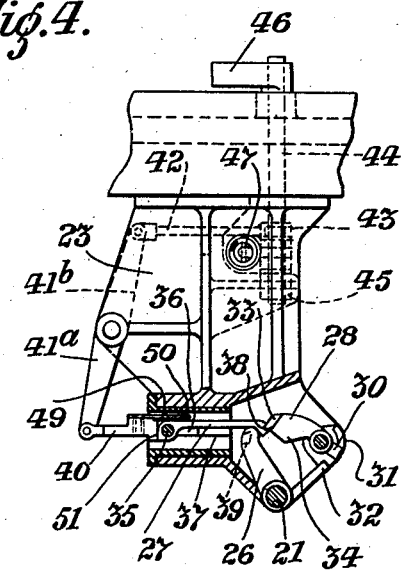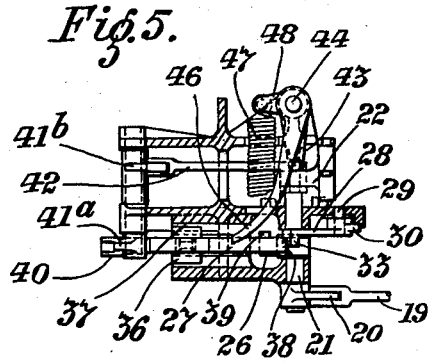

1,745,741

UNITED STATES PATENT OFFICE

DOUGLAS WHIMSTER CHISHOLM, OF GLASGOW, SCOTLAND, ASSIGNOR TO THE BIRCHFIELD ENGINEERING COMPANY LIMITED, OF CARDIFF, WALES

MANUFACTURE OF BUTT AND LAP WELDED TUBES

Application filed October 11, 1926, Serial No. 140,820, and in Great Britain February 2, 1926.

This invention relates to the manufacture of welded tubes by tube welding machinery of the type wherein a metal strip heated in a furnace is drawn through a bell or die and after a suitable welding gas has been applied to the edges of the strip, the edges are closed and welded together by the action of rolls and (or) other suitable devices.

According to one of the features of the present invention I provide welding machinery of the type specified comprising relatively movable closing rolls, a divided welding bell or die whose parts are separable, and automatically acting means whereby the rolls and the parts of the bell or die can be simultaneously brought together into operative position or moved apart out of operative position. The said means may comprise automatic control gear adapted to be actuated in accordance with the operation of the draw bench chain, and may be such that the speed of separation and approach of the rolls and the parts of the bell or die is gradually reduced before the end of said separation or approach.

According to another feature of the invention I provide tube welding machinery, of the type specified, comprising means (which may or may not be automatic in action) whereby the rolls and the die parts can be simultaneously brought together into or moved apart out of operative position, and means whereby one of the parts of the die is changed automatically (so as to present a fresh surface) each time the parts, after separation, are brought together again. The last mentioned means may comprise an arrangement of half dies adapted for angular movement about a horizontal axis and adapted to be brought successively into operative relationship with a common fixed half die by automatic means which operates when the closing rolls are separated and then brought together.
According to a further feature of the invention I provide an auxiliary chamber for welding gas, located between the source of supply of the gas and its point or points of application.
Means may also be provided whereby both the closing rolls whether separated or together are kept in constant rotation.

The invention will now be described, by way of example, with reference to the annexed drawings in which:—

Fig. 1 is a side view of the tube welding machine showing the automatic gear for raising and lowering the upper closing roll and the upper die member, the two latter being shown raised.

Fig. 2 is a side view corresponding to Fig. 1 except that the upper closing roll and upper die member are shown lowered.

Fig. 3 is an enlarged detail elevation (taken from the rear) of part of the machine shown in Fig. 1.

Fig. 3ª is a detail view of parts in Fig. 1.

Fig. 4 is a detail view similar to Fig. 3, except that the operating members are shown in a different position.

Figure 4ª is a fragmentary section of the trip gear showing the parts in neutral position.

Figure 4ᵇ is a view similar to Figure 4ª but showing the parts in their next succeeding position.

Fig. 5 is a plan view (with the top plate of the bracket 23 removed) of the detail shown in the rear elevation, Fig. 4.

Figure 6:
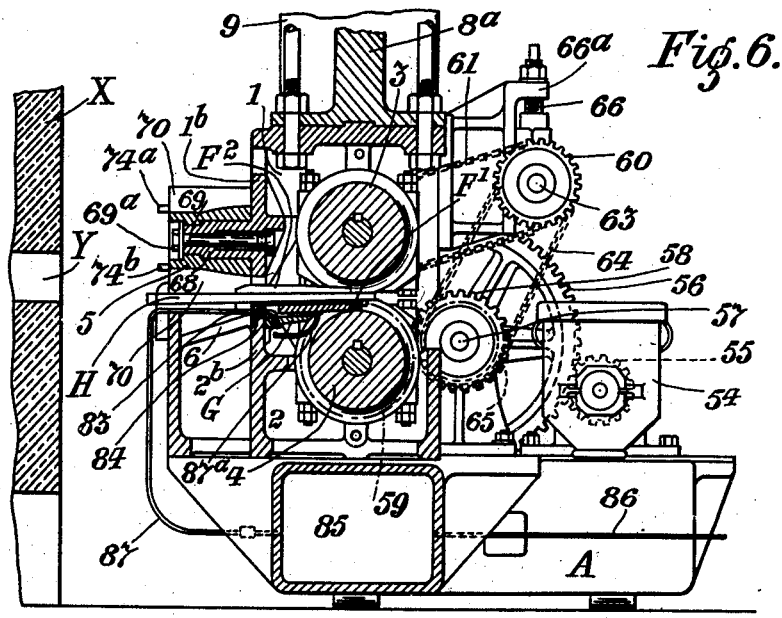

Fig. 6 is an enlarged detail view in side sectional elevation of a modification comprising the means for automatically changing the upper die member.

Figure 7:
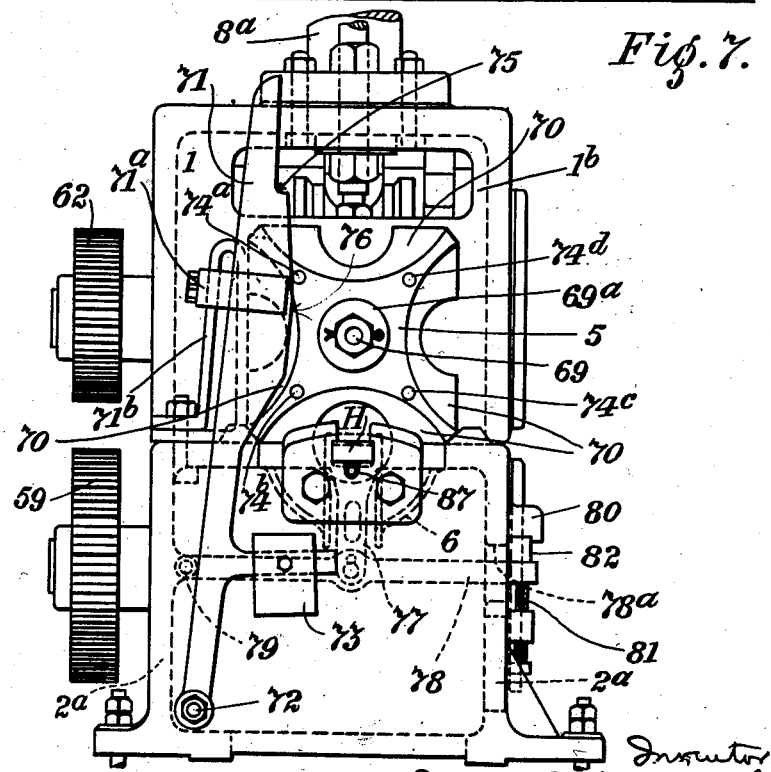

Fig. 7 is a front view (to a somewhat larger scale) of the arrangement shown in Fig. 6.

Referring to the drawings:—

On the tube welding machine is a vertically movable upper housing 1 and a fixed lower housing 2, the upper housing carrying the upper closing roll 3 and the upper half 5 of the welding bell of the machine, and the lower housing 2 carrying the lower closing roll 4 and the lower half 6 of the bell. The closing rolls 3, 4 and the upper and lower halves 5, 6 of the welding bell meet in operative relationship when the upper and lower housings 1, 2 are together.

For raising and lowering the upper housing 1, two hydraulic rams comprising cylinders 7, 8 are provided. These cylinders are situated directly above the closing rolls 3, 4 and are carried from the base of the machine by an overhanging frame or column 9. The ram for lifting the said upper housing 1 is disposed above the ram for effecting the downward movement thereof, the plunger 8ª of the latter ram being connected directly at it lower end to the said upper housing 1, and the lifting ram plunger 7ª being connected thereto through the medium of two connecting rods 10 attached at their lower ends to the said upper housing 1 and at their upper ends to a cross head 11 carried by the top end of the said lifting ram plunger 7ª.

Referring to the automatic control gear for the raising and lowering of the upper housing, it will be observed from Figs. 1 and 2, that a valve 12 is mounted on the column 9 supporting the hydraulic ram cylinders 7 and 8. This valve is of the two way type, being in communication with the pipe 13 leading to the lower cylinder 8, with the exhaust pipe 14, and with the high pressure supply pipe 15 through an elbow joint 15ª and a branch pipe 15ᵇ. The said valve 12 may thus place the lower ram cylinder 8 in communication with either the high pressure supply pipe 15 or the exhaust pipe 14. The upper cylinder 7 normally remains in constant communication with the supply pipe 15, the relative surface areas of the two ram plungers 7ª and 8ª being such that when, as required, the pressure fluid is admitted to the lower ram plunger 8ª, the excess of pressure on the said lower (and larger) ram plunger 8ª over the upper (and smaller) ram plunger 7ª is sufficient to lower the upper housing 1. Of course, when the lower ram cylinder 8 is opened by means of the valve 12 to the exhaust pipe 14 the pressure in the upper cylinder 7 causes the said upper housing 1 to rise.

In order that the opening and closing of the valve 12 may be effected automatically the control gear hereinafter to be described is provided:—

On the spindle of the valve 12, a lever 16 is fixed so that by turning the said lever upwards and downwards from the horizontal position, shown in full lines Figs. 1 and 2, the cylinder 8 of the lower ram can be placed in communication with the high pressure supply pipe 15 (as shown in chain dotted lines in Fig. 1) or the exhaust pipe 14 (as shown in chain dotted lines in Fig. 2) respectively. The end of the said valve lever 16 remote from the hydraulic rams 7, 8 is connected to the arm of a bell-crank 17 by a rod 18. The other arm of the said crank 17 is connected by a link 19 to a crank 20 (not shown in Figs. 1 or 2 but appearing in the detail view Fig. 3ª and in the plan view Fig. 5 which latter corresponds to the partly sectioned enlarged rear elevation Fig. 4). The said crank 20 is fixed upon a spindle 21 at the end thereof remote from the crank 22.

The spindle 21 is carried by a bracket 23 bolted to the draw-bench D. On the free end of the crank 22 a roller 24 is mounted, the said roller normally projecting into the path of a "cup" 25 (see Fig. 1) carried by the draw chain E. On the spindle 21 between the crank 22 and the crank 20, a trip lever 26 is secured (see Figs. 3, 4 and 5). This lever 26 is adapted to co-operate with a trip link 27 and a tripper 28 for the purpose of operating the valve lever 16 (see Figs. 1 and 2) so as to raise the upper housing 1, as will be hereinafter described.

The tripper 28 (see Figs. 3, 4 and 5) is rotatably mounted on a pin 29 carried by the bracket 23, and is formed with a rearwardly projecting lug 30, which is adapted to move between two fixed stops 31, 32. At its outer end the tripper 28 is formed with a nose-piece 33 projecting sideways at right angles to the plane of the tripper (as shown in Fig. 5). On its under surface the tripper 28 is formed with an enlargement 34 for the purpose hereafter specified.

The trip link 27 is rotatably carried by a pin 35 mounted in a cross-head 36, which is slidable in guides 37. The free end of the said trip link 27 is hook shaped as shown in Figs. 3 and 4, the internal radius of curvature of the hook portion being substantially equal to that of the top end of the trip lever 26. The said hook shaped end of the link 27 is formed moreover with a notch 38, of which the shape corresponds to that of the nosepiece 33 on the tripper 28. At the top end of the trip lever 26 a lug 39 is formed projecting sideways from the plane of the said lever 26.

As will be seen from Fig. 5 of the enlargement 34 on the tripper 28 is in the same plane as the lug 39 on the trip lever 26, whilst the nose piece 33 on the tripper 28 is coplaner with the trip link 27.

The neutral condition of the apparatus is shown in Fig. 1, the upper housing 1 being elevated so that the apparatus is in condition for an attendant to thrust the usual tongs endwise between the separated housing members 1 and 2, and engage the tongs with a heated strip in the furnace and then drop the tongs down upon the draw bench in position to be engaged by the "cup" 25 of the draw chain E. The neutral condition of the trip gear is shown in Fig. 4ª, the trip lever 26 being in a substantially upright position in parallelism with the crank 22, and the trip link 27 disengaged from the trip lever 26. It will here be noted that the crank 22 and the trip lever 26 are carried by the rock-bar 21 at substantially the same angular relation thereto, and therefore the trip lever 26 moves with and in the same direction as the crank 22.

On the pin 35 carrying the trip link 27, a link 40 is also mounted. This link 40 at its outer end is connected by a rocking lever 41ª, 41$^b$ and a rod 42 to a crank 43 secured to an upright shaft 44 (Fig. 1). The said shaft 44 is journalled in a bearing 45 on the bracket 23 and its upper end carries a kick-lever 46 which normally projects into the path of the draw chain E (which passes over the crank 22 shown in Fig. 5) so that when the "cup" 25 (see Fig. 1) arrives at the said lever 46, the latter is forced (to the left in Fig. 2) out of the path of the draw chain E. If no tube has been connected by the gripping tongs to the draw chain E, the kick lever 46 thereafter resumes its normal position as constrained by the spring 47 (broken away for the sake of clearness in Fig. 5) attached to the crank 48 on the upright shaft 44. In the event, however, of a tube being drawn through the die (5, 6) and closing rolls (3, 4) the said kick-lever 46 is held over in its new position, until by engagement of the tube with the kick-lever the inner end of the welded tube has passed and escaped from the kick-lever, after which the kick-lever resumes its normal position as before.

The link 40 connecting the trip link 27 and rocking lever 41 is provided with a leaf spring 49, adapted to press down upon a small rib 50 formed on the upper surface of the trip link 27. The said trip link 27 is prevented from falling below the horizontal position illustrated in Fig. 4 by the abutment of its flat heel portion 51 on the adjacent upright face of the link 40.

In order that the mechanism described in the foregoing may be clearly understood, the operation thereof in the course of one complete cycle of the draw chain E will now be described:—

Assuming the upper housing 1 with the upper die block 5 and upper closing roll 3 is already raised, and the trip gear in its neutral condition as shown in Fig. 4$^a$ it will be seen from Fig. 1 that the approach of the "cup" 25 on the draw chain E towards the crank 22 will ultimately cause the said crank to rotate and, through spindle 21, crank 20 and link 19, rock the bell crank 17 in an anti-clockwise sense about its pivot thereby drawing down the rod 18 and turning the valve lever 16 in a clockwise direction, all as shown in chain dotted lines in Fig. 1. The said movement of the valve lever 16 causes the lower ram cylinder 8 to be placed in communication with the high pressure supply pipe 15, whereby, as before described, the upper housing 1 (with upper roll 3 and top half die 5) is caused to descend. The rotation of the rock-bar 21 by the action of the "cup" 25 of course causes the trip lever 26 to move to the right from its neutral position in Fig. 4$^a$ to the position in Fig. 4$^b$. This movement of the trip lever 26 is not interfered with by the tripper 28, because the under surface of said tripper is in the shape of an arc of which the center corresponds to the axis of the shaft 21 on which the trip lever 26 is mounted so that the part 26 may be moved from its position in Figure 4$^a$ to the position in Figure 4$^b$ without raising the tripper 28, as the lateral projection 39 merely slides along the under surface of the tripper 28.

When the said upper housing 1 comes towards the end of its descent, the finger 52 on one of the rods 10, connecting the upper hydraulic ram plunger 7$^a$ with the upper housing 1, comes into contact with the valve lever 16. Thereafter the continued descent of the finger 52 gradually causes the valve lever 16 to be returned to the normal horizontal position, as shown in full lines in Fig. 2, which position is assumed when the die parts and rolls are in operative relationship. In this position the valve 12 is closed both to supply pipe 15 and exhaust pipe 14; therefore the housing 1 remains at rest and upon the lower housing 2. Simultaneously with the closing of the valve 12 the cranks 17 and 22 are returned to their neutral positions shown in full lines in Figs. 1 and 2, by the upward movement of the rod 18, which swings the bell crank 17 and the crank 22 to the right resulting in the turning of the rock-bar 21, which in turn swings the trip lever 26 from its position in Fig. 4$^b$ back to its neutral position in Fig. 4$^a$. The gradual closure of the valve 12 ensures that the speed of the roll 3 and the half die 5 is gradually reduced before the end of the lowering movement.

As the "cup" 25 on the draw chain E continues its movement beyond the crank 22 and over the usual chain sprocket wheel $d$, it eventually comes into contact with the kick-lever 46, which is thereby forced over to the position shown in full lines in Figs. 2 and 3. Such movement of the kick-lever 46 results in the trip link 27 being thrust forward, from its neutral position shown in Fig. 4$^a$ to its position shown in Fig. 3, so that the hook shaped end portion thereof rides over the top end of the trip lever 26 and, by reason of the leaf spring 49, engages the said top end of the said trip lever 26 as shown in Fig. 3. From the same figures of the drawings it will be observed that when the trip lever 26 is in the neutral position, the lug 39 on the said lever abuts against the enlargement 34 on the tripper 28, so that the nose piece 33 on the tripper is held upwards out of the path of the notch 28 on the hook shaped end of the trip link 27.

Should no tube be drawn through the die and closing rolls, the movement of the "cup" 25 past the kick-lever 46 will result in the latter being returned to its normal position by means of the spring 47 as hereinafter referred to. Such return movement causes the trip lever 26 to be drawn backwards by the trip link 27 from the position of Fig. 3 to the position of Fig. 4, thereby rocking the rock bar 21 so that the bell-crank 17 is rotated in a clockwise sense and thereby pushes up the rod 18 attached to the end of the valve lever 16, all as shown in chain dotted lines in Fig. 2. This movement of the said valve lever 16 results in the lower ram cylinder 8 being placed in communication with the exhaust pipe 14 with the consequent raising of the upper housing 1 as before explained.

Normally, that is, when a tube is drawn out of a furnace and through the die and rolls by the drawn chain E, it keeps the kick lever 46 "open" and while it remains in this position the automatic upward movement of the upper housing 1 will not take place until the inner end of the welded tube has passed the kick-lever 46 whereupon the kick-lever "closes" or returns to the position Fig. 1.

It will therefore be understood that the lever 46, the spring 47 and associated parts constitute a potential device which is in cooperative relation with the strip and is held by the strip in a potential condition while the strip is moving through the apparatus. Furthermore the potential device is associated with the gas controlling means so as to actuate the same to effect closing of the gas conduit when the strip passes out of cooperation with the lever 46 and thereby releases the potential device.

The extreme position of the trip-lever 26 and trip link 27 corresponding to the full-exhaust position of the valve 12 is shown in Figs. 4 and 5.

As the upper housing 1 continues its ascent the finger 53 on one of the rods 10 connecting the said housing 1 and the upper ram plunger 7ª comes into contact with the valve lever 16 and moves the latter in a clockwise sense to the position shown in full lines in Fig. 1. The effect of this movement of the valve lever 16 is to close the valve 12 gradually both from the supply pipe 15 and exhaust pipe 14 and thereby reduce and finally bring to zero the speed of the ascending roll 3 and half die 5. At the same time, the bell crank 17 is rotated, by the rod 18, in an anti-clockwise direction so as to reset the crank 22 and trip lever 26 to their neutral position. In this position the tripper 28 is thrust upwards, whilst the trip link 27 springs backward to the position shown in Fig. 4ª.

When the foregoing movements have been completed, the "cup" 25 will be travelling along below the draw bench D towards the crank 22. Thus the complete cycle of operations entailed in the automatic lowering and raising of the upper housing 1 has been completed, and a new cycle ensues.

Referring to the modification of the invention shown in Figs. 6 and 7:—

The lower closing roll 4 is driven by means of an electric motor 54 through gearing 55, 56 shaft 57 and gearing 58, 59. The upper roll 3 receives its drive from a sprocket wheel 60 through a chain 61 which passes over the sprocket wheel 62 (see Fig. 6) on the shaft of the upper roll 3. The wheel 60 is mounted on a countershaft 63 which is driven by a chain 64 passing over a sprocket wheel 65 on the shaft 57 (the wheel 65 being situated behind the gear wheel 59 in the view shown in Fig. 6). This arrangement obviates the disadvantages such as possible jarring of the gear teeth when the upper roll is lowered, attendant upon a direct drive between the sprocket wheels 59 and 62. In the present arrangement, the upper roll 3, as well as the lower roll 4, is kept in constant rotation, whether the rolls are together or apart. The countershaft 63 is adjustable vertically by means of the screw 66 supported by the threaded bracket 66ª, so that the tension of the chains 61, 64 may be varied.

On the upper housing 1, a central boss 68 is formed, integral with the front wall 1ᵇ, and on this boss 68 a multiple die block 5 of substantially square outline (see the enlarged view, Fig. 7) is rotatably mounted. The die block 5 is held in place on the boss 68 by means of a bolt 69 and washer 69ª. Each side of the block 5 is formed with a large concave tapering depression 70, as shown, the depression in each case being flared outwardly towards the front of the block and constricted to substantially semi-cylindrical shape towards the rear. In this manner each side of the block 5 virtually constitutes the upper half of a skelping die, of which the lower half (6) is formed integral with the lower housing 2. It will be observed that the flared end of each depression 70 is not coaxial with the constricted semi-cylindrical end thereof, so that the skelping of the strip by the die is effected smoothly and gradually, without abrupt change in the curvature of the strip, the edges thereof being first bent downwards and then the strip finally given its open-jointed tube shape as it passes through the rear part of the die.

Adjacent to the multiple die block 5, a lever 71 (Fig. 7) is arranged, this lever being pivoted at its lower end on a bolt 72 on the lower housing 2 and being constrained by a weight 73 to lean over towards the axis of the die-block. On the front of the block 5, four pins 74ª and 74ᵈ are arranged, these pins being disposed on the two diagonals of the block at equal distances from one another as shown. In virtue of the weight 73, the lever 71 rests against one of the pins (74ª in Fig. 7) so that when the upper housing 1 with the die block 5 is raised, the pin 74ª, and, subsequently, the pin 74ᵇ, slide up the contiguous edge of the lever 71, the upward movement of the housing 1 being such that the latter pin 74ᵇ, rises above the step 75 of the lever 71, which lever, in virtue of the weight 73, thereupon moves inwards towards the axis of the block 5 and projects the step 75 beneath the said pin 74ᵇ. Thus, when the housing 1 is lowered again, the pin 74ᵇ is arrested by the projecting step 75, whereupon the die block is partially rotated about its boss 68. When the block has almost completed a quarter of a turn, the pin 74$^c$ on the die block 5 comes against the enlarged part 76 of the edge of the lever 71 and thereby knocks the said lever 71 sideways and releases the pin 74$^b$ from the step 75. The continued downward movement of the housing 1 results in the multiple die block 5 being brought down into operative relationship with the lower half 6 of the die, the said block, in the course of its upward and downward movement, having been rotated automatically through 90°. The sideways movement of the lever 71 away from the die block 5 is limited by a stop 71$^a$ carried upon the upper housing 1 by the bracket 71$^b$.

On the lower half 6 of the die a bar H (Fig. 6) is provided, the said bar having attached to its smaller end (Fig. 6) a fixed mandrel F$^1$.

To press the fixed mandrel F$^1$ down upon the interior of the edges of the skelped strip as it passes through the rolls, a depending strap 77 (Fig. 7) is employed, this strap being connected to a bar 78, one end of which is pivoted to a bolt 79 carried by the side member 2$^a$ of the lower housing 2 and the other end of which extends through a slot 78$^a$ in the other side member 2$^a$ between a fixed lug 80 and a stop bolt 81. A wedge 82 is adapted to be inserted between the fixed lug 80 and the adjacent end of the bar 78 and is adapted to be driven between the said parts sufficiently far to bring the said end down on the stop bolt 81 which is set so that, when the bar rests thereon, a predetermined pressure is brought to bear on the interior of the edges of the strip as it passes through the rolls.

A loose mandrel F$^2$ is supported by the wall 2$^b$ of the lower housing 2, a collar 83 being formed on the adjacent end of the mandrel F$^2$ and a corresponding seat 84 being formed on the upper edge of the wall 2$^b$.

Within the frame A of the welding machine, as shown in Fig. 6, a chamber 85 is provided for the supply of welding gas, the gas being led by a pipe 86 to the said chamber from a supply provided nearby. The welding gas (for example, oxygen) is applied to the skelped edges of the strip at two places namely, where the edges pass through the guide G, and in advance of the said guide, just before the "pass" of the rolls 3, 4. In the first place, the oxygen passes from the chamber 85 by way of the pipe 87 which, in the construction illustrated is led up the front of the housing 2 and thence along below the bar H to the mandrel F$^2$ and guide G. A second pipe 87$^a$ is led from the chamber 85 to a point in advance of the guide G, the nozzle of this pipe 87$^a$ being close to the "pass" between the rolls 3 and 4. The chamber 85 ensures a more regular supply and a more constant pressure of oxygen at the nozzle of the pipes 87, 87$^a$.

In Figs. 1 and 2 means for automatically controlling the supply of welding gas is shown. This means comprises a globe or other suitable valve 88 which is mounted on the fixed lower housing 2 of the welding machine above the draw bench D.

The valve stem 89 of the valve 88 is normally pressed upwards by the compressed spring 89$^a$. In this position the globe valve is closed. When the upper housing 1 is lowered into operative relationship with the lower housing 2, however, the valve stem 89 is forced downwards by a finger 90 fixed to the said upper housing 1 directly above the said valve stem 89. When the stem 89 is so forced down, the valve 88 is opened, so that as long as the upper housing 1 remains in operative relationship with the lower housing 2, the supply of welding gas can pass upwards from the auxiliary chamber 85 by the pipe 85$^a$, and through the valve 88 to the two pipes 87 and 87$^a$. These pipes lead the welding gas to the edges of the skelped strip as described in connection with the modification illustrated in Fig. 6.

In Fig. 6, the position of the strip heating furnace relatively to that of the tube welding machine is shown at X, the reference Y indicating the mouth of the furnace.

By means of the multiple die block above described it is ensured that one part of the skelping die is changed automatically each time the parts of the die are separated and then brought together, whereby the liability of the die to become choked with scale is entirely obviated and further increase in the output of welded tubes per unit of time is effected.

By means of the automatic control gear hereinbefore described, the supply of welding gas and the raising and lowering of the upper die member and the upper closing roll are controlled with greater ease and precision than hitherto, whilst it is obvious that the welding operations as a whole may be considerably accelerated.

It will be obvious that many other constructional modifications may be made in my invention without departing from the scope thereof and it will therefore be understood that I do not confine myself to the constructional forms hereinbefore set forth.

I claim:—

1. For use in the manufacture of welded tubes from metal strips, tube welding machinery comprising closing rolls capable of relative adjustment towards or away from one another, means for rotating the said rolls, a divided welding die whose parts are separable, means for drawing the strip through said die and rolls, mechanism operable by the drawing means and strip whereby the rolls and the parts of the die are simultaneously brought together into operative position or moved apart out of operative position.

2. Tube welding machinery comprising closing rolls capable of relative adjustment towards or away from one another, means for rotating the said rolls, a divided welding die whose parts are separable, means whereby the rolls and the parts of the die can be simultaneously brought together into operative position or moved apart out of operative position, and means whereby one of the parts of the die is changed automatically so as to present a fresh skelping surface each time the said parts are separated and afterwards brought together.

3. Tube welding machinery comprising closing rolls capable of relative adjustment towards or away from one another, means for rotating the said rolls, a divided welding die whose parts are separable, automatically acting means whereby the rolls and the parts of the die are simultaneously brought together into operative position and moved apart out of operative position, and means whereby one of the parts of the die is changed automatically so as to present a fresh skelping surface each time the said parts are separated and afterwards brought together.

4. For use in the manufacture of welded tubes from metal strips, tube welding machinery, comprising relatively movable closing rolls, means for rotating the said rolls, a divided welding die whose parts are separable means for drawing the strip through said die and rolls, trip mechanism operable by the drawing means and strip whereby the rolls and the parts of the die are simultaneously brought together into operative position or moved apart out of operative position.

5. Tube welding machinery comprising superposed closing rolls capable of relative adjustment towards or away from one another, means for rotating the rolls, a multiple die block of substantially rectangular form each side of which block conforms to the shape of half of a skelping die, a horizontal axis about which the multiple die block is turnable, a fixed half die, means whereby the upper closing roll and the multiple die block are adapted to be raised or lowered simultaneously out of or into operative relationship with the lower closing roll and the fixed half die, and means whereby the half-die shaped sides of the multiple die block are brought successively into operative relationship automatically by the aforesaid raising and lowering of the upper closing roll and multiple die block.

6. For use in the manufacture of welded tubes from metal strips, tube welding machinery comprising superposed closing rolls capable of relative adjustment towards or away from one another, means for rotating the rolls, a multiple die block of substantially rectangular form each side of which block conforms to the shape of half of a skelping die, a horizontal axis about which the multiple die block is turnable, a fixed half-die, means for drawing the strip through the fixed half-die and co-operating movable half-die and then through the rolls, mechanism operable by the drawing means and strip whereby the upper closing roll and the multiple die block are adapted to be raised or lowered simultaneously out of or into operative relationship with the lower closing roll and the fixed half die, and means whereby the half-die shaped sides of the multiple die block are brought successively into operative relationship automatically by the aforesaid raising and lowering of the upper closing roll and multiple die block.

7. Tube welding machinery comprising closing rolls capable of relative adjustment towards or away from one another, means for rotating the said rolls, a divided welding die whose parts are separable, automatically acting means whereby the rolls and the parts of the die are simultaneously brought together into operative position or moved apart out of operative position and means whereby the speed of separation and approach of the rolls and the parts of the die is gradually reduced before the end of said separation and approach.

8. For use in the manufacture of welded tubes from metal strips, tube welding machinery comprising superposed closing rolls capable of relative adjustment towards or away from one another, means for rotating the rolls, a draw bench, a draw bench chain, means for operating the chain, an element on said chain for attachment thereto of the strip, a multiple die block of substantially rectangular form each side of which block conforms to the shape of part of a skelping die, a horizontal axis about which the multiple die block is turnable, a fixed partial die, mechanism operable by said element on said chain and by said strip whereby the upper closing roll and the multiple die block are adapted to be raised or lowered simultaneously out of or into operative relationship with the lower closing roll and the fixed partial die, means whereby the partial-die shaped sides of the multiple die block are automatically brought successively into operative relationship with the fixed partial die by the aforesaid raising and lowering of the upper closing roll and multiple die block, and means whereby the speed of raising and lowering the upper roll and the multiple die block is gradually reduced before the end of said raising and lowering.

9. Tube welding machinery comprising closing rolls capable of relative adjustment towards or away from one another, a driving shaft, gearing connecting one of said rolls with said driving shaft, a countershaft, chain and sprocket means connecting the other of said rolls with said counntershaft, chain and sprocket means connecting said countershaft and driving shaft so as to keep the closing rolls whether separated or together in constant rotation, a divided welding die whose parts are separable, and automatically acting means whereby the rolls and the parts of the die are simultaneously brought together into operative position or moved apart out of operative position.

10. Tube welding machinery comprising superposed closing rolls capable of relative adjustment towards or away from one another, means for rotating the rolls, a multiple die block of substantially rectangular form each side of which block conforms to the shape of a skelping die, a horizontal axis about which the multiple die block is turnable, a fixed half die, means whereby the upper closing roll and the multiple die block are adapted to be raised or lowered simultaneously out of or into operative relationship with the lower closing roll and the fixed half die, a lever pivotally mounted alongside the multiple die block, a step on the edge of said lever adjacent to the said block, an integral enlargement on the said edge below the said step, pins diagonally arranged on the front of the die block at equal distances from the axis thereof, and means to constrain the said lever constantly towards the axis of the die block, the arrangement being such that, when the upper housing is raised, the said step is projected beneath one of the pins on the block, and, when the upper housing is lowered, the said pin is arrested by the step and the die block is rotated about its axis till the aforesaid step is retracted automatically by another of the said pins acting on the enlargement of the lever, whereafter the block, having been rotated through a quarter turn, subsides into contact with the fixed lower half of the die.

11. Tube welding machinery comprising superposed closing rolls capable of relative adjustment towards or away from one another, means for rotating the rolls, a divided welding die composed of separate upper and lower members, and fluid pressure means whereby the upper roll and upper die member are adapted to be raised or lowered simultaneously, said fluid pressure means comprising an upper ram, a larger lower ram, a high pressure fluid supply conduit, an exhaust conduit, means whereby the upper ram is kept in constant communication with the said high pressure fluid conduit, valve means for putting the lower ram into communication with the exhaust conduit or the aforesaid supply conduit, a control element for said valve means, and trip means movable with said rams so as automatically to operate said control element so as to effect raising and lowering of said upper roll and upper die member by said rams.

12. Tube welding machinery of the type having a draw bench and draw bench chain with means for operating the latter comprising superposed closing rolls capable of relative adjustment towards or away from one another, means for rotating the rolls, a divided welding die composed of separate upper and lower members, fluid pressure means whereby the upper roll and the upper die member are adapted to be raised or lowered simultaneously, said fluid pressure means comprising an upper ram, a larger lower ram, a high pressure fluid supply conduit, an exhaust conduit, means whereby the upper ram is kept in constant communication with the said high pressure fluid conduit, a two way valve disposed in the fluid conduit between the lower ram and the said high pressure and exhaust conduits, trip gear actuated according to the operation of the draw bench chain so as to control the admission and exhaust of pressure fluid to and from said lower ram and means adapted to move with the upper roll and upper die member whereby the opening through said valve, whether opened to exhaust or supply, is automatically and progressively reduced to zero at the end of the stroke of the hydraulic rams.

13. Tube welding machinery comprising superposed closing rolls capable of relative adjustment towards or away from one another, means for rotating the rolls, a multiple die block of substantially rectangular form, each side of which block conforms to the shape of a skelping die, a horizontal axis about which the multiple die block is turnable, a fixed half-die, fluid pressure means whereby the upper closing roll and the multiple die block are adapted to be raised or lowered simultaneously out of or into operative relationship with the lower closing roll and the fixed half die, and means whereby the half-die shaped sides of the multiple die block are brought successively into operative relationship automatically by the aforesaid raising and lowering of the upper closing roll and multiple die block, the said fluid pressure means comprising an upper ram, a larger lower ram, a high pressure fluid supply conduit, an exhaust conduit, means whereby the upper ram is kept in constant communication with the said high pressure fluid conduit, and means whereby the lower ram is automatically put into communication with the exhaust conduit or the aforesaid supply conduit according as the upper die member and the upper roll are to be raised or lowered respectively.

14. Tube welding machinery of the type having a draw bench and draw bench chain with means for operating the latter, comprising superposed closing rolls capable of relative adjustment towards or away from one another, means for rotating the rolls, a divided welding die composed of separate upper and lower members, fluid pressure means whereby the upper roll and upper die member are adapted to be raised or lowered simultaneously, said fluid pressure means comprising an upper ram, a larger lower ram, a high pressure fluid supply conduit, an exhaust conduit, means whereby the upper ram is kept in constant communication with the said high pressure fluid conduit, a two way valve disposed in the fluid conduit between the lower ram and the said high pressure and exhaust conduits, a cup on the draw bench chain, a rotatably mounted crank projecting into the path of the said cup and actuated thereby so as to lower the upper roll and upper die member, a crank rotatable with the first mentioned crank and connected to the operating lever of the valve controlling the raising and lowering, a trip lever rotatable with said cranks, and means whereby the said trip lever can be operated so as to raise the said upper roll and upper die member.

15. For use in the manufacture of welded tubes from metal strips, tube welding machinery comprising closing rolls capable of relative adjustment towards or away from one another, means for rotating the said rolls, a divided welding die whose parts are separable, means for drawing the strip through said die and rolls, mechanism operable by the drawing means and strip whereby the rolls and the parts of the die are simultaneously brought together into operative position or moved apart out of operative position, means adapted to support the interior and exterior of the edges of the skelped strip just before it is acted on by the closing rolls, means whereby the edges of the skelped strip are subjected to a bath of welding gas while being supported on the exterior and interior thereof by the said supporting means, and an auxiliary chamber for the welding gas, located between the source of supply of the gas and its place of application.

16. Tube welding machinery comprising closing rolls capable of relative adjustment towards or away from one another, means whereby both the closing rolls whether separated or together are kept in constant rotation, a divided welding die whose parts are separable, means whereby the rolls and the parts of the die can be simultaneously brought together into operative position or moved apart out of operative position, means whereby one of the parts of the die is changed automatically so as to present a fresh skelping surface each time the said parts are separated and afterwards brought together, means adapted to support the interior and exterior of the edges of the skelped strip just before it is acted on by the closing rolls, means whereby the edges of the skelped strip are subjected to a bath of welding gas while being supported on the exterior and interior thereof by the said supporting means, an auxiliary chamber for the welding gas, located between the source of supply of the gas and its place of application, and means whereby the supply of welding gas is turned off and on automatically at the separation and bringing together of the parts of the die.

17. Tube welding machinery comprising closing rolls capable of relative adjustment towards or away from one another, means for rotating the said rolls, a divided welding die whose parts are separable, one part being fixed and the other part rotatable, means for rotating the rotatable part.

18. Tube welding machinery of the type having a draw bench and draw bench chain with means for operating the latter, comprising closing rolls, a movable housing for one roll, a fixed housing for the other roll, a partial die carried by the movable housing, a partial die on the fixed housing, means for moving the movable housing and means controlled by the presence of a strip in the machine being operated upon for controlling the movements of the movable housing.

19. Tube welding machinery comprising closing rolls, a movable housing for one roll, a fixed housing for the other roll, a partial die carried by the movable housing, a partial die on the fixed housing, means for drawing the strip through the completed die and rolls, means for moving the movable housing, trip mechanism operable by the drawing means so as to cause the last mentioned means to bring said partial dies and rolls together, and means for automatically causing the trip mechanism to actuate the means for moving the movable housing to return said partial dies and rolls to separated position after the strip has passed therethrough.

20. Tube welding machinery comprising a divided skelping die whose parts are separable, closing rolls capable of relative movement towards or away from one another, means for rotating the said rolls, means for supplying welding gas to the edges of the skelped strip before said edges are closed, a draw bench and chain, and automatically acting means controlled by the draw chain to simultaneously bring together the rolls and the parts of the die into operative position and controlled by the passage of the tube to move them apart out of operative position, and means whereby the supply of welding gas is turned off and on automatically at the separation and bringing together of the rolls and parts of the die.

21. An apparatus for skelping and gas welding strips into tubes, having a conduit for supplying welding gas to the edges of the strip, gas controlling means, means for actuating the gas controlling means to open the gas supply conduit, and means in cooperative relation with and normally held inactive by the strip for actuating the gas controlling means to effect closing of the gas conduit when the strip passes out of cooperation with said means.

22. An apparatus for skelping and gas welding strips into tubes, having a conduit for supplying welding gas, gas controlling means, means actuated by a moving part of the apparatus for automatically actuating the gas controlling means to open the gas supply conduit, a potential device in cooperative relation with the strip and held in a potential condition by the strip while moving through the apparatus, said potential device being associated with the gas controlling means to actuate the same and effect closing of the gas conduit when the strip passes out of cooperation with and releases said potential device.

23. An apparatus for skelping strips into tubes, comprising in combination die parts relatively movable towards and away from one another, means for bringing the die parts together into operative position or for moving them apart out of operative position, means for energizing the die moving means, a draw chain having a trip in cooperative relation with the energizing means for moving the same to actuate the die moving means to effect closing of the die parts, and potential means held inactive by the strip while passing through the apparatus for actuating the energizing means to reverse the action of the die moving means and effect separation of the die members when the strip passes out of cooperation with said potential means.

In testimony whereof I affix my signature.

DOUGLAS WHIMSTER CHISHOLM.